May 4, 1965   F. L. BERTUCCI   3,181,446
TWIN LENS CAMERA
Filed June 21, 1961   2 Sheets-Sheet 1
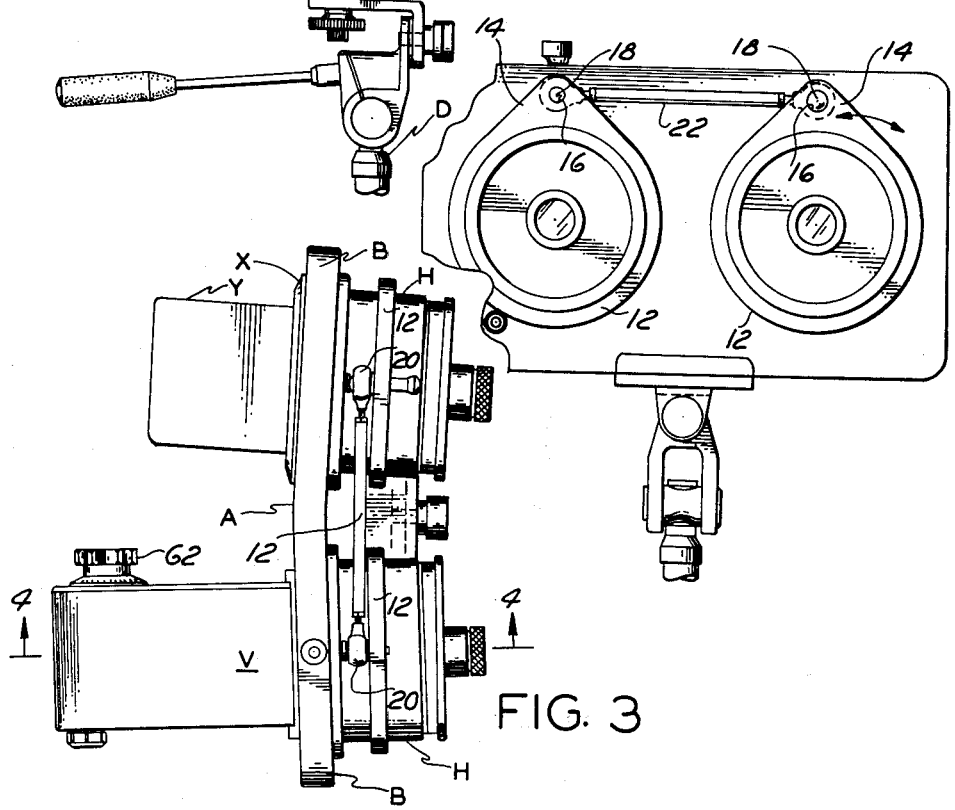
INVENTOR.
FRANK L. BERTUCCI
BY
William C. Babcock
ATTORNEY May 4, 1965   F. L. BERTUCCI   3,181,446
TWIN LENS CAMERA
Filed June 21, 1961   2 Sheets-Sheet 2

INVENTOR.
FRANK L. BERTUCCI
BY
ATTORNEY

United States Patent Office 3,181,446
Patented May 4, 1965

3,181,446
TWIN LENS CAMERA
Frank L. Bertucci, 2442 E. Spaulding Ave.,
Long Beach, Calif.
Filed June 21, 1961, Ser. No. 118,643
1 Claim. (Cl. 95—44)

The present invention relates generally to the field of photography, and more particularly to a twin lens camera of novel design in which the lenses are matched, with one lens being used for taking a picture, and the other lens for viewing the object or objects to be photographed.

During the past few years photography has steadily increased in popularity as a hobby, and as a result, cameras of various designs have been evolved and marketed for use by both professionals and amateurs alike. The design trend of these newer cameras has been directed to automation; that is, provision is made whereby the camera automatically compensates for various light conditions and minimizes the possibility that the user will take a poor picture.

Although such cameras are a boon to the majority of photographers, they are not considered satisfactory or desirable by certain professionals having extensive experience in photography, and who may take several hundred pictures in a day's time. Due to their prior experience, such professionals do not require such mechanical means as fully automatic shutters, built-in light meters, and like accessories in order to secure workmanlike photographs. The rugged, severe usage to which a camera is subjected by professionals often causes a breakdown of the automatic devices of the type described whereby repairs are required within a relatively short time and it is necessary for the photographer to maintain two or more cameras in order to be certain that one will be available at all times.

A primary purpose in devising the present invention is to provide a camera of simple structure and design that is exceedingly sturdy and will withstand hard usage with a minimum of maintenance attention, which due to the incorporation of a pair of matched lenses therein, permits the professional to use the camera to view the object or objects to be photographed in exactly the form in which the object or objects will appear on the developed film.

Another object of the invention is to provide a camera of is synchronized to permit focusing of the taking lens having a pair of laterally separated focusing tubes movably supported therefrom in which a mechanism is provided that so connects these tubes that the movement thereon the light-sensitive plate in the same form as the subject to be photographed is seen through the viewing lens.

Another object of the invention is to provide a twin lens camera in which the film-carrying magazine is so mounted thereon that the magazine can be rotated through an angle of 90° to expose a frame of a film in either a vertical or horizontal position.

These and other objects of the present invention will become apparent from the following description thereof, and from the accompanying drawings in which:

FIGURE 1 is a side elevational view of the twin lens camera mounted on a tripod;

FIGURE 2 is a front elevational view of the camera shown in FIGURE 1;

FIGURE 3 is a top plan view of the camera shown in FIGURE 1;

Figure 4:
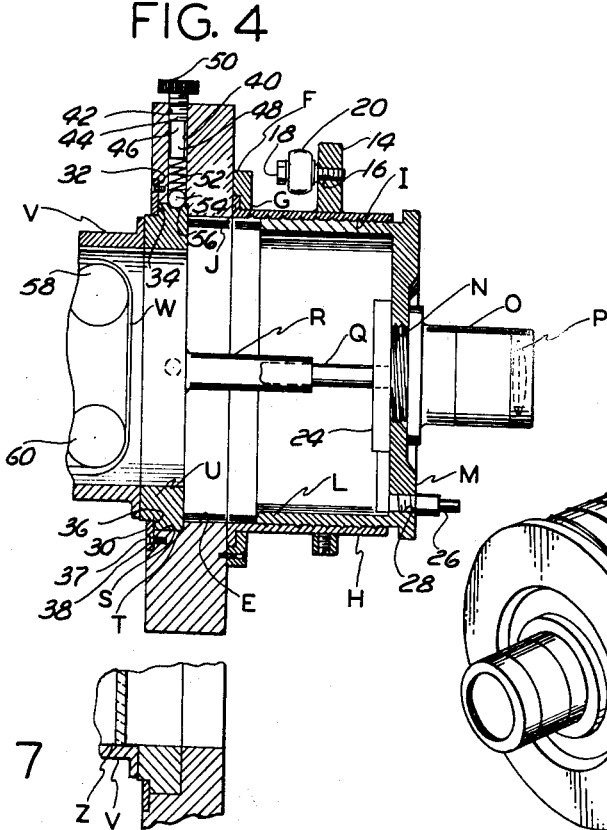
FIGURE 4 is a vertical cross-sectional view of the camera taken on line 4—4 of FIGURE 3.
Figure 5:
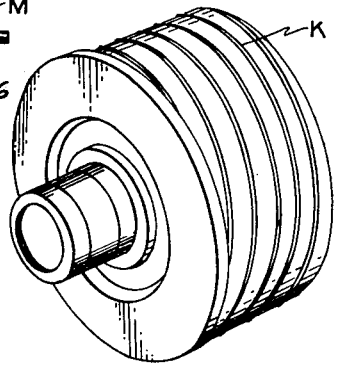
FIGURE 5 is a perspective view of one of the lens supported in the forward portion of one of the focusing tubes.
Figure 7:
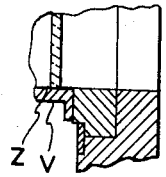
FIGURE 7 is a fragmentary, vertical cross-sectional view of the camera taken on line 7—7 of FIGURE 6.
Figure 6:
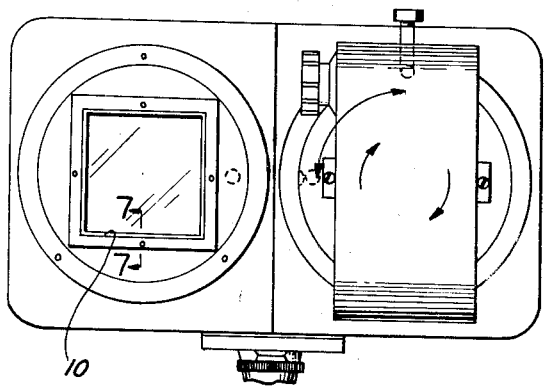
FIGURE 6 is a rear view of the invention.

With continued reference to the drawings for the general arrangement of the invention, it will be seen that a rigid member A is provided that includes two identical portions B which are slightly angularly disposed relative to one another, as best shown in FIGURE 3. Conventional means C are also provided on the lower portion of member A for removably affixing the member to the upper end of a tripod D. A relatively large opening E is formed in each of the portions B (FIGURE 4). Two rings F each having an outwardly disposed, circumferentially extending lip G, are affixed to the forward faces of portions B and encircle the openings E.

Two outer focusing tubes H which have circular flanges J projecting outwardly from the rear edges thereof are rotatably supported from portions B when the flanges are disposed in the space between the forward faces of portion B and the rear faces of lip G. Coarse spiral grooves I are formed on the interior surfaces of outer focusing tubes H and engage spiral threads K formed on the exterior surfaces of two inner focusing tubes L. Two end pieces M close the outer ends of the inner focusing tubes L. End pieces M have bores N formed in the centers thereof which are engaged by the rear threaded ends of the two tubes O in which matched lenses P are supported. The two tubes O are coaxially aligned with inner focusing tubes L. Rods Q extend rearwardly from end pieces M and are slidably movable in two tubes R which are rigidly connected to portion B and extend forwardly therefrom. The purpose of rods Q and tubes R is to prevent rotation of the inner focusing tubes L when the outer focusing tubes H are rotated relative thereto.

Circular recesses S are formed in the portions B rearwardly of the opening E. Body shoulders T are formed in portions B at the junction of recesses S and openings E. A ring U is rotatably supported in one of the recesses S. A film magazine V is provided that has a forward open end, which open end is connected to interior portons of ring U. Ring U and magazine V are rotatably and adjustably supported from one of the portions B whereby a frame of light-sensitive film W in the magazine can be exposed in either the horizontal or vertical position as will be described in detail hereinafter.

A second ring X is supported in the other of the circular recesses S, with the inner portion of this second ring being connected to the forward open end of a housing Y. A frosted glass plate Z is supported transversely inside housing Y and preferably at the same longitudinal position therein that a frame of film W occupies when the frame is disposed for exposure in magazine V. A centrally disposed aperture 10 is formed in the rear end of housing Y in longitudinal alignment with the frosted glass plate Z.

The outer focusing tubes H have circumferentially extending ribs 12 that project outwardly from the exterior surface thereof. Ribs 12 develop on the upper portions thereof into two plates 14 that have tapped bores 16 extending transversely therethrough. Two screws 18 engage bores 16, and these screws also pivotally engage two eye-defining members 20. Members 20 are rigidly connected to one another by a rigid rod 22, as may best be seen in FIGURE 2.

A shutter mechanism 24 of conventional design is disposed in that one of the inner focusing tubes L forwardly of the magazine V. The shutter mechanism 24 preferably abuts against the interior surface of the one of the end pieces M forwardly of magazine V. Shutter mechanism 24 normally obstructs all light from passing rearwardly through the tube O associated therewith onto film W. However, when a portion of an activating mechanism 26 of conventional design has been moved manually, portions of the shutter are momentarily moved to admit light to magazine V to expose one frame of the film W therein. Actuating mechanism 26 preferably projects forwardly through a bore 28 formed in the portion M forwardly of the shutter mechanism 24.

The ring U from which magazine V projects rearwardly is held within the confines of recess S by an annulus-shaped plate 30. Plate 30 fits within the confines of a circular groove 32 formed in the rear surface of one of the portions B situated forwardly of magazine V. Plate 30 has an inner circular portion 34 that slidably engages a circumferentially extending rear surface 36 formed on ring U. A number of spaced openings are formed in plate 30 through which screws 37 extend forwardly to engage tapped bores 38 formed in that portion B situated forwardly of magazine V. It is, of course, desirable when magazine V and ring U are rotated to dispose the frame of film W to be exposed in either a horizontal or vertical position, that the magazine and ring be removably locked against inadvertent movement relative to member A.

A bore 40 extends downwardly from the upper surface of that portion B situated forwardly of magazine V. Bore 40 is preferably in vertical alignment with the center of opening E disposed forwardly of magazine V, and the upper portion of bore 40 has threads 42 formed on the interior surface thereof. Threads 42 are engaged by threads 44 formed on the upper portion of a shank 46 of a screw 48. Screw 48 is provided with a head 50.

The upper end of a compressed helical spring 52 bears against the lower end of shank 46. As may be seen in FIGURE 4, spring 52 is situated in bore 40. The lower end of spring 52 at all times tends to move a ball 54 downwardly into contact with the exterior surface of ring U.

Two recesses 56 are formed in the exterior surface of ring U and spaced 90° from one another. Recesses 56 are so disposed in ring U that when one of the recesses is engaged by ball 54, the frames on film W are vertically positioned, and when the ball engages the other recess, the frames on film W are horizontally situated. The film W, which is preferably of 90 millimeter size, is supported on two spools 58 and 60 within the confines of the magazine V. One of the spools is adapted to be manually rotated by a handle 62 that projects outwardly from magazine V (FIGURE 3). Inasmuch as the spool support for film W in magazine V is conventional, no structural details thereof need be shown and described.

The purpose of having the portions B angularly disposed relative to one another is to cause the tube O containing lens P to be so oriented relative to the subject (not shown) to be photographed, that the subject seen through aperture 10 will be reproduced as a light image on film W when the shutter 24 is momentarily opened by use of actuator 26.

The operation of the invention is extremely simple. Film magazine V is first loaded with film W, and the first frame 64 of film W placed in longitudinal alignment with lens P. With the camera mounted on the tripod D (FIGURE 1) it is ready for use. The photographer then sights the camera on the subject to be photographed by looking through aperture 10. Rod 22 is moved laterally to rotate the outer focusing tubes H and concurrently move both lenses P forwardly or rearwardly relative to portions B. This forward and rearward movement of lenses P is continued until the light image of the subject to be photographed is observed with maximum clarity on the glass plate Z. Shutter 24 is thereafter opened momentarily by use of actuator 26, whereby the same light image observed by the photographer is recorded on the light-sensitive surface of the frame 64 in alignment with the lenses P forwardly of magazine V.

It will be obvious to those skilled in the art that various changes may be made in the invention without departing from the spirit and scope thereof, and therefore the invention is not limited by that which is shown in the drawings and described in the specification, but only as defined in the appended claim.

I claim:

In a portable camera:

(a) first and second matched lenses;

(b) first and second tubes in which said first and second lenses are transversely mounted;

(c) first and second end pieces that support said first and second tubes in forwardly extending positions therefrom, which tubes are in coaxial alignment with bores formed in said end pieces;

(d) first and second inner focusing tubes extending rearwardly from said first and second end pieces, which tubes are in coaxial alignment with said bores in said end pieces, with said inner tubes having first threads formed on the exterior surfaces thereof;

(e) first and second outer focusing tubes having second threads formed on the interior surfaces thereof which engage said first threads;

(f) a magazine having a forward open end adapted to hold light-sensitive film;

(g) a first ring mounted on the forward end of said magazine and projecting outwardly therefrom;

(h) a housing having a open forward end and a viewing opening formed in the rear thereof;

(i) an elongate rigid member having two forwardly and outwardly extending portions that are in angular relationship, which portions have first and second openings extending forwardly therethrough, with the rear of said first opening terminating in a first circular recess wherein said first ring is rotatably supported;

(j) first means for removably maintaining said first ring in said first recess to permit selective rotation of said magazine to expose film contained therein either vertically or horizontally;

(k) second means for supporting said housing with said open end adjacent the rear surface of said member and said housing being in coaxial alignment with said second opening;

(l) a frosted transparent plate positioned transversely in said housing;

(m) third and fourth means for supporting the rear ends of said first and second outer focusing tubes from the forward surface of said rigid member and in co-axial alignment with said first and second openings;

(n) fifth manually operable means for concurrently rotating said first and second outer focusing tubes relative to said first and second inner focusing tubes to move said first and second lenses in fixed parallel paths relative to said film in said magazine and said frosted plate to focus said lenses on an object to be photographed, which object is viewable on said frosted plate in the position it will be reproduced on said film;

(o) shutter means for establishing light communication between said first lens and said film in said magazine;

(p) two rods rigidly affixed to said first and second end pieces which extend rearwardly therefrom; and (q) two tubes affixed to said member and coaxially aligned with said rods, which rods are slidably movable in said tubes, with said rods and tubes cooperatively preventing rotation of said first and second inner focusing tubes when said first tubes are concurrently rotated to move said first and second inner focusing tubes forwardly and rearwardly relative to said member.

References Cited by the Examiner

UNITED STATES PATENTS

| | | | |
|---|---|---|---|
| 552,246 | 12/95 | Haarstick | 95—44 |
| 1,788,645 | 1/31 | Velten | 95—38 |
| 1,813,428 | 7/31 | Seitz | 95—18 X |
| 2,003,754 | 6/35 | Miller | 95—18 X |
| 2,478,301 | 8/49 | Mourfield | 95—18 |
| 2,527,106 | 10/50 | Smith | 95—18 |
| 2,552,244 | 5/51 | White | 95—44 |

NORTON ANSHER, Primary Examiner.

L. W. VARNER, JOHN M. HORAN, Examiners.